United States Patent
Goodman (10) Patent No.: US 6,586,937 B2
(45) Date of Patent: Jul. 1, 2003

(54) MAGNETIC SIGNATURE DETECTOR FOR DETECTION OF MAGNETIC BURIED TARGETS

(75) Inventor: William L. Goodman, Los Altos Hills, CA (US)

(73) Assignee: Gas Research Institute, Des Plaines, IL (US)

( * ) Notice: Subject to any disclaimer, the term of this patent is extended or adjusted under 35 U.S.C. 154(b) by 0 days.

(21) Appl. No.: 09/945,550

(22) Filed: Aug. 30, 2001

(65) Prior Publication Data

US 2002/0075001 A1 Jun. 20, 2002

Related U.S. Application Data (60) Provisional application No. 60/229,496, filed on Aug. 30, 2000.

(51) Int. Cl.[7] ............................ G01V 3/08; G01V 3/165; G01R 33/022
(52) U.S. Cl. ........................................ 324/326; 326/345
(58) Field of Search ................................ 324/326, 367, 324/327, 328, 329, 345, 253, 254, 255, 260, 262, 331, 244, 247

(56) References Cited

U.S. PATENT DOCUMENTS

| | | | |
|---|---|---|---|
| 3,875,497 A | | 4/1975 | Madsen |
| 4,309,659 A | * | 1/1982 | Yoshii ........................ 324/326 |
| 4,710,708 A | * | 12/1987 | Rorden et al. ......... 324/207.26 |
| 4,885,536 A | | 12/1989 | Blanpain et al. |
| 5,036,210 A | | 7/1991 | Goodman |
| 5,321,361 A | | 6/1994 | Goodman |
| 5,354,521 A | | 10/1994 | Goodman |
| 5,622,169 A | | 4/1997 | Golden et al. |
| 5,633,589 A | * | 5/1997 | Mercer .................. 324/207.26 |
| 6,038,496 A | | 3/2000 | Dobler et al. |
| 6,255,825 B1 | * | 7/2001 | Seigel et al. ................ 324/326 |

FOREIGN PATENT DOCUMENTS

| | | |
|---|---|---|
| DE | 196 52 977 | 4/1998 |
| GB | 2 166 872 | 5/1986 |
| GB | 2 331 157 | 5/1999 |

* cited by examiner

*Primary Examiner*—Jay Patidar
(74) *Attorney, Agent, or Firm*—Mark E. Fejer (57) ABSTRACT

An apparatus for measuring and detecting a magnetic signature of a magnetically detectable object from a distance includes a portable sensor group for detecting the magnetic signature. The portable sensor group includes three gradient sensors, each of the three gradient sensors adapted to independently measure both a magnitude and a direction of the magnetic signature, a first of said gradient sensors measuring an axial gradient in the vertical direction, a second of said gradient sensors measuring a first horizontal gradient in the vertical direction, and a third of said gradient sensors measuring a second horizontal gradient in the vertical direction.

27 Claims, 4 Drawing Sheets

DETAILED PIPE GRID (TYP.)

FIG. 6B

MAGNETIC SIGNATURE DETECTOR FOR DETECTION OF MAGNETIC BURIED TARGETS

CROSS REFERENCE TO RELATED APPLICATION

This application claims the benefit of U.S. Provisional Application No. 60/229,496 filed Aug. 30, 2000.

BACKGROUND OF THE INVENTION

1. Field of the Invention

This invention relates to a magnetic pipe locator having three axes for determining the magnitude and direction of the magnetic field generated by underground pipes having a magnetic signature.

2. Description of Prior Art

Pipes buried below the surface of the earth require periodic service and/or repair. Damaged pipes must be located and excavated in order to receive such service. Location of underground pipes is a traditionally difficult task, especially in areas containing large networks of underground pipes, wires and other buried objects.

Underground pipelines are generally constructed of either metal or, commonly, plastic such as polyethylene and polyvinyl chloride. Plastic is a preferred pipe material because it is durable, inexpensive, lightweight, inert, easy to manufacture and easy to install. However, plastic pipe, if not treated, is undetectable with traditional underground pipeline location methods.

Plastic pipe may be treated to impart a detectable feature into the plastic and allow for detection for repair and/or service. Goodman, U.S. Pat. No. 5,036,210, and Goodman, U.S. Pat. No. 5,354,521, are methods of making a magnetically detectable plastic pipe by distributing magnetic particles within the wall of the plastic pipe during the extrusion of the pipe. The '210 patent and the '521 patent teach that distinct magnetic signatures may be created by changing the polarity of predetermined portions of the magnetic particles within the pipe.

Prior art magnetic pipe locators do not have the capability to discriminate against other buried magnetic objects, called clutter, in the vicinity of the target pipe. A pipe locator is desired which can identify a pipe having a unique pipe signature, such as the signature created by the pipes taught by the '210 patent and the '521 patent. The need for a pipe locator with the capability to discriminate against clutter is created by buried magnetic plastic pipe which may be as magnetic and sometimes less magnetic than other buried magnetic objects.

Prior art pipe locators commonly use a single vertical magnetic field sensor. One problem of the prior art pipe locators in recognizing a unique magnetic signature of a pipeline, such as a spiral signature, is that the signature may have a rather long wavelength, for instance 20 feet. This means that the operator of a hand held locator must traverse a considerable distance before gathering enough information for the pipe spiral signature to be recognized. A way of solving this is to add memory and processing so that a map of a region can be displayed after capturing the original data.

Prior art locators add magnetic polarity detection to enable the changing direction of the spiral pipe magnetization to be detected. Prior art locators include single axis magnetic sensors.

One prior art pipe locator, taught by Goodman, U.S. Pat. No. 5,321,361, was developed to extend the performance of the existing technology in the ability to detect and display magnetic field direction as well as magnitude. This locator employed two fluxgate sensors arranged in a gradient configuration and a vertical position and balanced so that the locator would not respond to rotations in the Earth's uniform 50,000 gamma magnetic field. This locator was equipped with a tone generator to indicate the presence of magnetic objects and a meter to indicate whether the detected field was up or down. The threshold detection capability of this locator was is about 50 gammas, enabling detection of 5% and 7% barium and strontium plastic pipes down to depths of 5 feet. This locator also includes a visual LCD bar graph display of the output signal of both the amplitude and polarity of the output. The locator also included a range changing feature important when signals with large magnitude variation are encountered, typical when both magnetic pipe and large amounts of pipe are present.

SUMMARY OF THE INVENTION

It is one object of this invention to provide a new and improved magnetic pipe locator for detecting magnetically detectable plastic pipe or other sources of magnetic fields from a distance.

It is an object of this invention to provide an apparatus that detects both the magnitude and direction of an underground magnetic field.

It is another object of this invention to provide a magnetic pipe locator that can detect a specific magnetic pattern despite the presence of clutter.

It is yet another object of this invention to provide a magnetic pipe locator that is insensitive to the earth's magnetic field.

It is still another object of this invention to add memory and processing to a magnetic pipe locator so that a map of a region can be displayed after capturing the relevant data.

These and other objects of this invention are achieved with a magnetic pipe locator having three axis sensing capability. Prior art pipe locators generally contain sensors in one or possibly two axes. The use of three orthogonal sensors enables both the magnitude and direction of the surface magnetic field to be measured. Since the spiral pipe magnetization pattern is essentially a constant magnitude change in the direction of pipe magnetization along its length, the use of three sensors provides enhanced ability to recognize this pattern in the presence of clutter. Most clutter signals encountered show large magnitude and direction changes in magnetization. Generally one axis will be minimally affected by clutter even if the other two axes are obscured to a degree.

The pipe locator according to this invention is also capable of recognizing unique magnetic pipeline signatures, such as spiral signatures. Because of the memory and processing capabilities of the multi-axis locator according to the present invention, a map of a region can be displayed after capturing the original data. This allows the multi-axis pipe locator operator to identify specific pipe signatures within the inspected region.

The multi-axis pipe locator according to this invention has the capability of producing maps of the magnetic field intensity over an area. This affords the possibility of performing sophisticated pattern recognition analysis of the surface magnetic field. Since magnetized plastic pipe often produces a distinct magnetic signature, the multi-axis pipe locator according to this invention is potentially much more capable of recognizing the pipe in the presence of clutter. It employs discrete sensors and is capable of producing real time maps of magnetic pipe signatures.

BRIEF DESCRIPTION OF THE DRAWINGS

This and other objects and features of this invention will be better understood from the following detailed description taken in conjunction with the drawings wherein.

DESCRIPTION OF PREFERRED EMBODIMENTS

Figure 1:
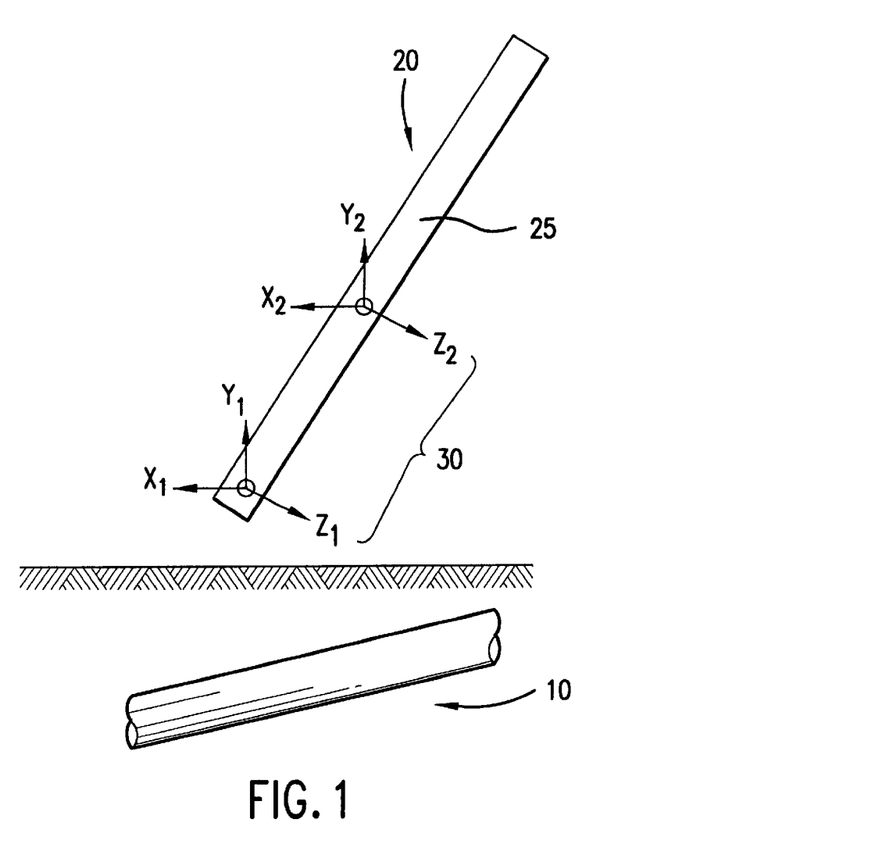
FIG. 1 is a schematic of a locator according to one preferred embodiment of this invention.

Locator 20 for measuring and detecting a magnetic signature of a magnetically detectable object from a distance is shown schematically in FIG. 1. Portable sensor group 30 is positioned within locator 20 for detecting the magnetic signature. Portable sensor group 30 preferably comprises three gradient sensors 40, 50 and 60. Each of the three gradient sensors 40, 50, 60 are preferably adapted to independently measure both a magnitude and a direction of the magnetic signature. A signal output device 70 is also connected to each of the three gradient sensors 40, 50, 60.

Figure 2:
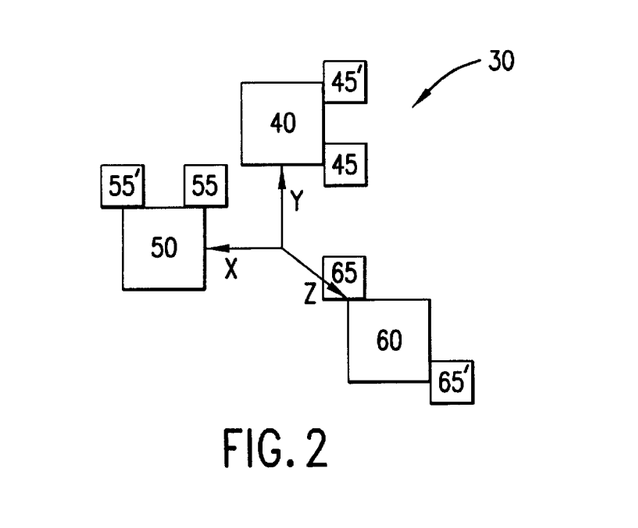
FIG. 2 is a schematic of three gradient sensors according to one preferred embodiment of this invention.

As used in the specification and claims, a gradient sensor is a sensor that collects signals from two distinct locations. Therefore, as shown in FIG. 1, an X gradient is measured by the difference between X1 and X2; a Y gradient is measured by the difference between Y1 and Y2; and a Z gradient is measured by the difference between Z1 and Z2. As shown schematically in FIG. 2, a first of said gradient sensors 40 preferably measures an axial gradient in the vertical direction. A second of said gradient sensors 50 preferably measures a first horizontal gradient in the vertical direction. A third of said gradient sensors 60 preferably measures a second horizontal gradient in the vertical direction.

According to a preferred embodiment of this invention, each of the three gradient sensors 40, 50, 60 comprise a pair of fluxgate sensors 45, 55, 65. As shown schematically in FIG. 2, each pair of fluxgate sensors 45, 55, 65 is preferably spaced apart relative to each other to form each of the three gradient sensors 40, 50, 60. According to one preferred embodiment of this invention, an X axis sensor 50 of said gradient sensors is positioned along an axis of wand 25, a Y axis sensor 40 of said gradient sensors is positioned sideways relative to the axis of wand 25, and a Z axis sensor 60 of said gradient sensors is positioned forward relative to the axis of wand 25.

As shown in FIG. 1, according to a generic embodiment of this invention, portable sensor group 30 is positioned within wand 25. According to this preferred embodiment of the invention, each of the three gradient sensors 40, 50, 60 comprise a first fluxgate sensor 45, 55, 65 located at one end portion of wand 25 and a second fluxgate sensor 45', 55', 65' located at an opposing end portion of wand 25.

Wand 25, signal output device 70 or any other particularly heavy or cumbersome component of locator 20 may be attached to a neckstrap to assist the operator in supporting locator 20. In addition, handle 27 may be positioned along locator 20 to assist in operator comfort.

Figure 3:
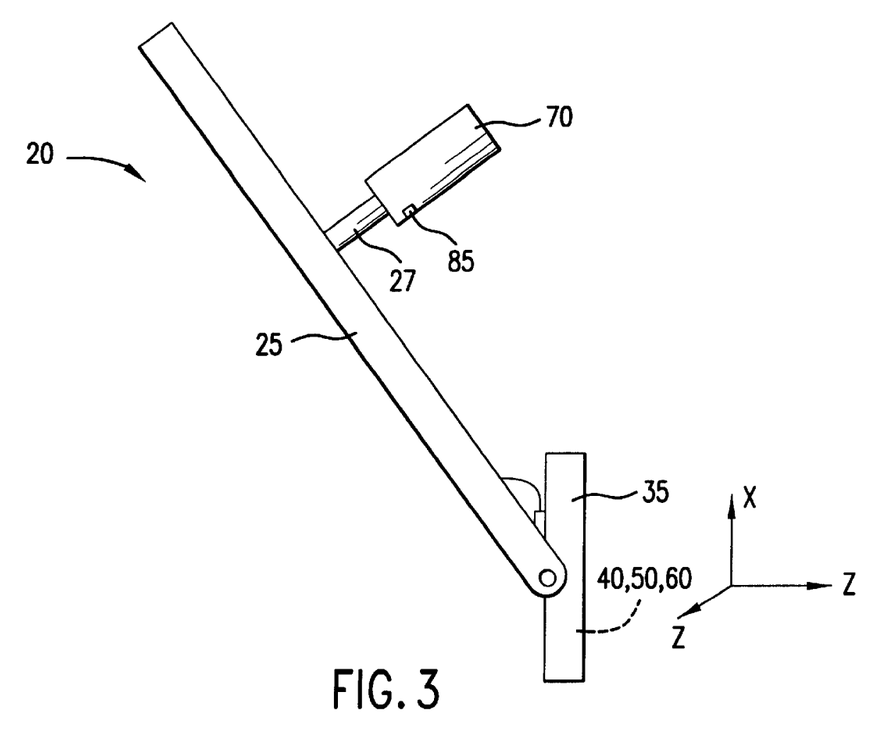
FIG. 3 is a side view of a locator according to one preferred embodiment of this invention.

As shown in FIG. 3, locator 20 in one preferred embodiment of this invention may include gradient sensors 40, 50, 60 located in a gradiometer tube 35 at the bottom of wand 25. According to one preferred embodiment of this invention, gradiometer tube 35 is approximately 12" long, therefore resulting in a separation between each pair of fluxgate sensors 45, 55, 65 and 45', 55', 65' of approximately 12". Gradiometer tube 35 may be rotatably positioned with respect to wand 25 to facilitate correct positioning of gradiometer tube 35 relative to the operator and the ground. In order to insure maximum sensitivity, gradiometer tube 35 should be positioned close to the ground during searches for buried pipe 10.

Locator 20 is preferably fabricated from a lightweight, durable material such as aluminum bar and tubular stock. The main chassis of locator 20 may comprise a square cross-section support tube or wand 25; a round battery compartment connected to one end of this support tube and gradiometer tube 35 supported from the other end.

Gradiometer tube 35 preferably contains three separate printed circuit boards which process the magnetic field sensor signals, digitize them and transfer then at high speed to a main processor circuit board preferably located within signal output device 70. Gradiometer tube 35 is preferably watertight and a water resistant four pin connector may be used to interconnect gradiometer tube 35 with respect to the main chassis of locator 20.

Locator 20 may be powered using batteries, for instance 6 "C"cell batteries loaded into the top of locator 20. This may be accomplished by removing a battery cap and pushing six cells into a battery compartment with the positive terminal facing into the compartment.

Figure 4:
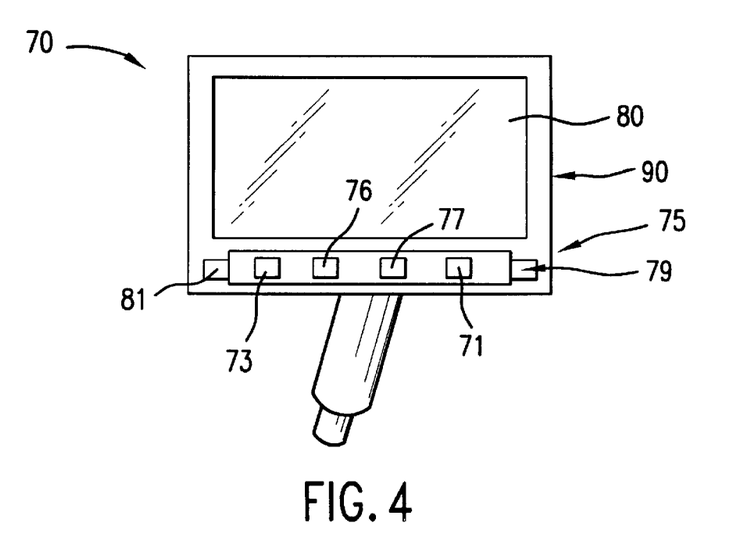
FIG. 4 is a front view of a signal output device according to one preferred embodiment of this invention.

A close-up of signal output device 70 is shown in FIG. 4. Although a particular arrangement of controls and display is shown, there are numerous combinations of controls and displays contemplated by this invention, including adding or subtracting one or more of the controls described herein. Signal output device 70 may include liquid crystal display (LCD) 80 and locator controls 75.

As shown in FIG. 3 and in more detail in FIG. 4, signal output device 70 preferably includes LCD display 80 and, in one preferred mode of operation, bar graphs of output signals generated by each of the three gradient sensors 40, 50, 60. Signal output device 30 preferably displays a magnitude of the magnetic signature detected by each of the three gradient sensors 40, 50, 60. In addition, signal output device 70 displays the direction of the magnetic signature detected by each of the three gradient sensors 40, 50, 60.

According to another preferred embodiment of this invention, mapping means 90 is connected to signal output device 70 for identifying a location of locator 20 (such as pipe locator) during measurement and detection. Mapping means 70 may comprise infrared triangulation signals for providing automatic position information or a global positioning system connected to signal output device 70.

Port 85 may be connected to signal output device 70 for porting the data to a data processor, such as a desktop or laptop computer. Port 85 may comprise a serial data port integrally connected with the signal output device.

Since there are three outputs associated with gradient sensors 40, 50, 60, the traditional method for displaying these outputs has been to use three bar graphs to represent the X, Y and Z axes. This mode of display is preferably, though not necessarily, implemented in locator 20. However, in order to improve the visual interpretation of the data, two "flying spot" display modes may be incorporated into locator 20. The user can alternate between bar graph mode and one or more flying spot display modes by pressing mode switch 77 on signal output device 70 shown in FIG. 4.

Figure 5A:
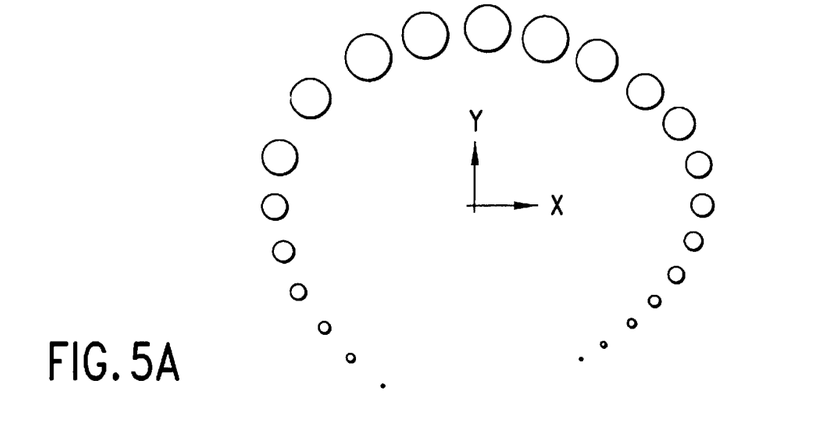
FIGS. 5A, 5B and 5C show a sequence of patterns generated by the locator according to one preferred embodiment of this invention.
Figure 5B:
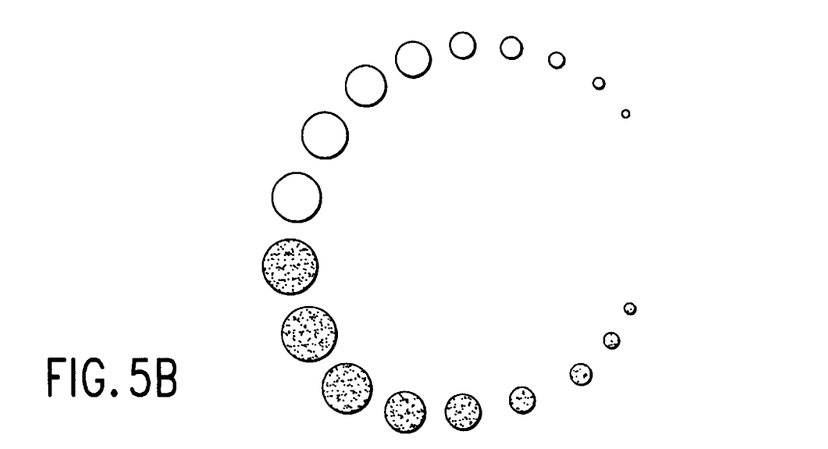
Figure 5C:
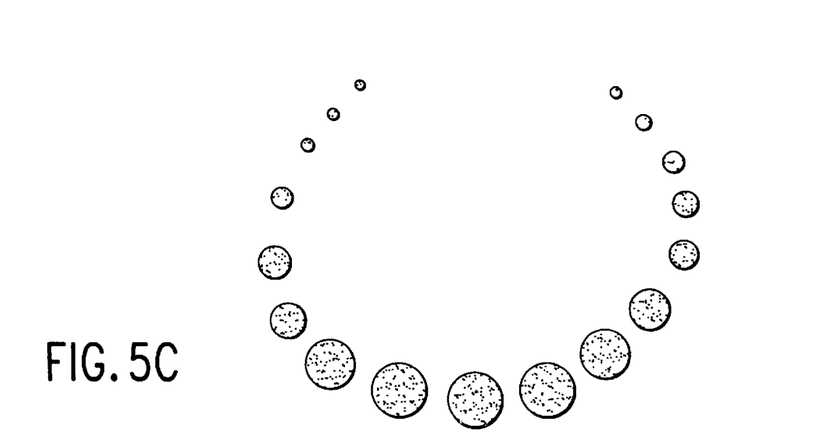

The flying spot display modes preferably use a circular spot to represent the direction of the measured field vector, such as shown in FIGS. 5A, 5B and 5C. The size of the spot represents the magnetic field magnitude. The first flying spot mode positions the spot using the X and Y magnetic signals. Y represents the up/down axis on the LCD display 80 and X represents the side-to-side axis on the LCD display 80. The size of the flying spot is determined by the magnitude of the total field. The polarity of the field (positive or negative) may be displayed by using either filled spots (+ field) or unfilled spots (− field). The second flying spot mode displays the Z axis in the up down axis instead of the X axis. The spot size is determined in this mode by the magnitude of the X axis signal.

Memory may be incorporated into the flying spot displays by adding a persistence to their existence in much the same way as that implemented in computer mice variable persistence displays. The memory feature is an important element of the flying spot method because it enables multiple measurements of the magnetic signal taken over an extended space (e.g. by swinging the locator from side-to-side) to be simultaneously viewed.

An important reason that the flying spot modes are easier to interpret than the bar graph outputs is due to the characteristic movements of the spot when locator 20 is moved side to side over pipe 10. For instance, if locator 20 is moved side-to-side perpendicular to buried pipe 10 (and over it) the flying spot (first flying spot mode) typically traces out an arc. As locator 20 is moved along pipe 10 the arc remains but it shifts from being large at the display top to being large at the display side and then large at the display bottom. FIGS. 5A, 5B and 5C show a sequence of typical flying spot patterns encountered over buried pipe 10 as the length of pipe 10 is traversed while locator 20 is swung from side-to-side.

According to the preferred embodiment shown in FIG. 4, there are two pushbuttons that assist in the control the operation of locator 20. "RNGE UP" and "RNGE DN" switches 71, 73 may be used to increase and/or decrease the sensitivity of locator 20. Preferably, when locator 20 powers up, it defaults to the lowest sensitivity (such as full scale= 8000 nT), typically within a good range to begin a search. By pushing the "RNGE UP" switch 71, the sensitivity is increase in increments such as 2 X, 5 X and/or 10 X. Higher sensitivities are useful in locating pipe 10 that is deeply buried.

The locator power and speaker volume may be controlled by a potentiometer 79 such as shown in FIG. 4. When locator 20 powers up, a sign on message may be displayed on LCD display 80. After initialization, locator 20 will begin to operate in flying spot mode 1. The mode switch 77 can be used to switch between display modes. Each push may change a mode of locator 20 as follows: flying spot mode 1; bar graph mode; flying spot mode 2.

The zero switch 76 enables the zeroing of the outputs of locator 20. This should be done when locator 20 is positioned in an area where the gradients are low. Typically as the user changes search direction, a small offset on the sensor outputs occurs. This is due to the fact that the gradiometer balance is not perfect. When searching in a straight line direction, it is often desirable to zero locator 20 when output from gradient sensors 40, 50, 60 are quiet (i.e., unchanging) as the search proceeds. This enables even very small anomalies to be more easily recognized.

According to one preferred embodiment of this invention, pivot knob 81 on the signal output device 70 can be used to unlock the rotational position of LCD display 80. When pivot knob 81 is pulled out, LCD display 80 can be rotated from side-to-side. This enables LCD display 80 to be more easily viewed during a search. Rotation of the LCD display 80 by 90° enables locator 20 to be easily stored in a flat carrying case.

Use of locator 20 in the field shows that an effective display method is flying spot mode 1. This is due to the fact that, in a prototype, locator 20 up/down (X) axis is displayed on the LCD display 80 as the side-to-side axis. The X axis fields produced by buried pipe 10 are twice the strength of the horizontal fields and thus it is helpful to display this field as an axis. Flying spot mode 2 also produces interesting displays but because it displays only the horizontal (Y and Z) pipe signatures as axes, it is less effective in separating the pipe signature from clutter than flying spot mode 1.

As discussed above, electronics within locator 20 may include 4 separate printed circuit boards. Three printed circuit boards are preferably housed within gradiometer tube 35—one printed circuit board to process lower magnetometer signals; one printed circuit board to process upper magnetometer signals; and one printed circuit board to enable the magnetometer signal subtraction, A to D conversion and serial transmission out of gradiometer tube 35.

The upper and lower magnetometer processing boards may be identical. The subtraction and A to D conversion printed circuit board is preferably microprocessor controlled (for instance by using an ATMEL ATMEGA103 processor) and communicates with a main system microprocessor preferably located in signal output device 70 by means of a high speed serial link.

As briefly described above, interconnection of the LCD mounted main PC board and gradiometer tube 35 is achieved by using a four conductor cable and waterproof connector. According to one preferred embodiment of this invention, the pinout for the connector is as follows: A +Vi; B ground; C serialout; and D unused.

The main system printed circuit board is preferably located inside the signal output device 70. The main system printed circuit board receives serial transmissions from gradiometer tube 35 and processes this data to produce the flying spot and bar graph displays of the magnetic signals. The main system printed circuit board also may monitor the inputs from controls 75 and executes control algorithms when these controls are operated.

The system software may comprise separate packages including 1) gradiometer microcode and 2) main processor code. The gradiometer code and the main processor code in one preferred embodiment of this invention are written in "C" computer language.

According to one preferred embodiment of this invention, specifications for a hand-held 3 axis detector 20 include: magnetic noise level: 100 nT; gradiometer balance: 1 part in 1000; power requirement: 6 "C" batteries; current consumption: 120 mA; approximate battery life: 24 hours (continuous operation); weight: 6.5 lbs; size: 55" long; LCD size: 3.5" H×4.5" W; and water resistant to permit operation in the rain.

A preferred method for searching for buried pipe is to hold locator 20 steady (i.e., not swinging from side to side) and walk around looking for a magnetic anomaly. Gradiometer tube 35 is preferably maintained close to the ground during this process to maximize the measured signal. Once an anomaly is located, locator 20 is preferably swung from side-to-side tracing out about a 3' arc. This will allow display of the magnetic signatures over the space covered by the arc. If the buried anomaly is a magnetic pipe, the flying spot will trace out a smooth arc. As locator 20 swing axis is rotated, the arc will change orientation. When the swing axis is perpendicular to the pipe, the arc will swing from side to side. In this orientation, as you walk along the pipe, the arc curvature will maximize when locator 20 is positioned over the point of maximum vertical field.

Aside from real-time data gathering and analysis described above, data may also be collected, stored and analyzed later. A method for locating buried magnetized plastic pipe within a search area preferably includes the step of measuring a magnitude and direction of a magnetic signature in an axial gradient in the vertical direction, in a first horizontal gradient in the vertical direction, and in a second horizontal gradient in the vertical direction using locator 20 having three gradient sensors 40, 50, 60. Preferably, measurements are collected in a search area defining a grid and measurements are collected at a plurality of points within the grid. The measurements from the individual grid coordinates are then analyzed, visually and/or electronically, to determine a location of pipe 10.

In general, for larger search areas, the coherence of the pipe location data will lead to larger pipe signal noise ratios. Clutter noise generally is not coherent except over a fairly small search region. This is true even for buried iron pipes; the primary magnetic signal generated by these is due to their permanent magnetism. This magnetization is usually random in magnitude and direction and when summed over large areas tends to cancel out with equal positive and negative signatures.

Data over a selected search area is gathered by setting out a grid and then collecting data at each grid point. This method results in obtaining accurate data to enable pipe pattern recognition algorithms to be applied. An automatic continuous reading system is required for this method. A navigation system is preferably incorporated into the locator. The navigation system allows the automatic association of magnetic pipe data with locations in the search area. In one preferred embodiment of this invention a local navigation system using R.F. or infrared triangulation signals is used for providing automatic position information. The global positioning system (GPS) may also be used for providing position information at high speed with accuracy greater than 1 foot.

Figure 6A:
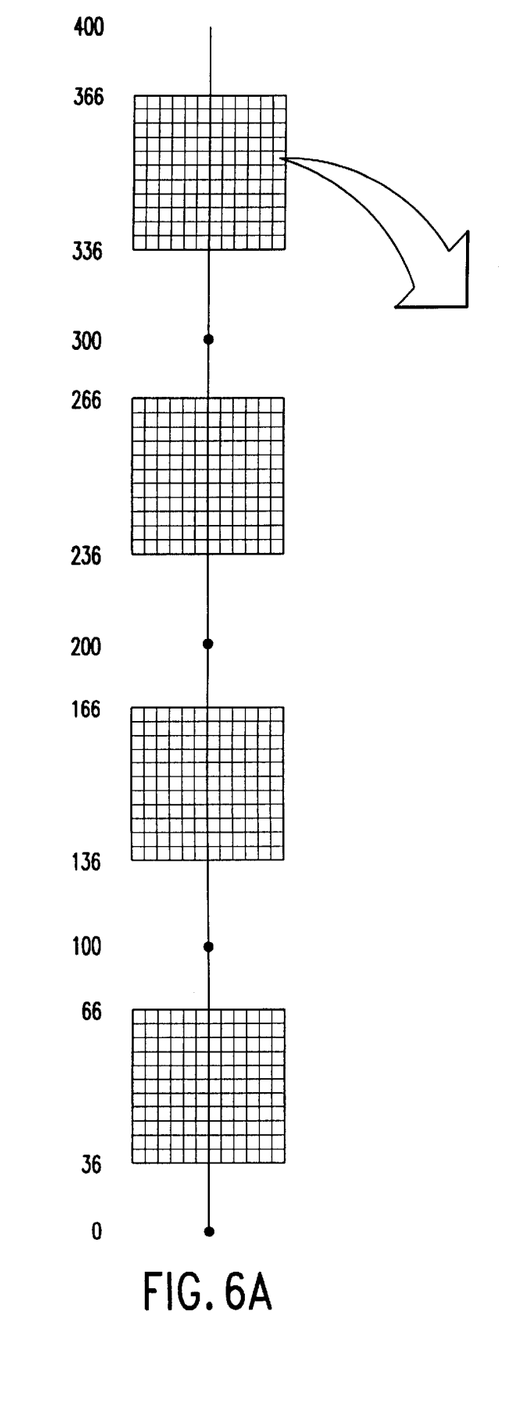
FIGS. 6A and 6B show a low resolution grid and a high resolution grid, respectively, used for gathering data with the locator according to one preferred embodiment of this invention.
Figure 6B:
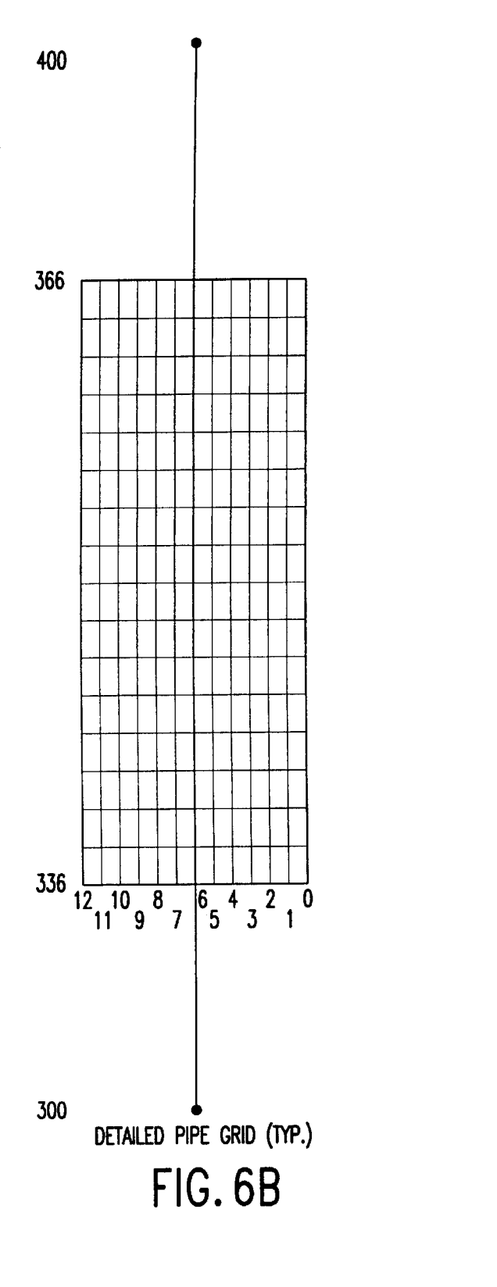

The general procedure employed when using the grid pattern mode is to lay out a grid pattern over the search area of interest as shown in FIG. 6A and 6B. Grid pattern intersections every one or two feet represent typical spacing intervals. After laying out the grid, locator 20 is systematically moved to each grid point and at each point the operator initiates the recording of data, such as by pushing a button on locator 20. Data is preferably gathered by traversing a line and recording data at each grid point, preferably every one or two feet. The operator then moves sideways to the adjacent grid point, preferably another one or two feet and begins the data gathering process again until the starting grid line is reached. The operator indicates the start of a new, adjacent line by sending a signal to locator 20, by pushing a second button in one preferred embodiment of this invention.

In one preferred embodiment of this invention, the grid layout consists of approximately 6–10 rows spaced one to two feet apart. Along each row, data is gathered at two foot intervals for approximately 100 feet. After gathering data in the above manner, locator 20 may connected through a serial port to a personal computer for downloading of the collected data from locator 20 to the personal computer.

To evaluate locator 20 performance, several tests were conducted. Pipe tests were carried out to determine the magnetic signatures of buried magnetic plastic pipe in an otherwise magnetically clean area. A 100 foot length of 7% strontium ferrite doped plastic pipe was buried at each of two foot, three foot, four foot, and five foot depths. Grids were then laid out over the pipe at each depth and detailed measurements of the magnetic signatures were made. Data may then be collected including identification of grid points from data collection points; X, Y and Z magnetic fields; and X, Y and Z gradient signals. Generally, the Y gradient data is the up data, the X gradient is the sideways data and the Z data represents the gradient along the data path. The pipe signature may then be developed.

The environmental tests were performed by taking locator 20 to several different sites and setting up measurement grids. Data was then taken at each grid crossing line. Grids were typically 100 feet long by 12 feet wide and generally were taken so as to match the magnetic pipe data grids discussed above. By taking data in this manner, the superposition of pipe data and data from various pipe environment locations was possible.

If custom software is not developed, a standard plotting program, such as MATHCAD™, may be used to plot out the pipe location data gathered from locator 20. Programs such as these permit rather sophisticated plots to be obtained in a short period of time. Three dimensional plot routines generally provide the best results.

During testing of locator 20 known environmental data was gathered at several locations. Actual pipe data may then be superimposed on environmental data. Before combining this data, the individual X, Y and Z pipe and environmental data may be combined by shifting the phase of these signals in accordance with the known relationships between them.

The method of combining the X, Y and Z axes data is made easier if some idea of the pipe orientation is known. In the absence of this information, a processing algorithm would combine the data by using trial assumptions of the pipe orientation for a variety of directions. Trial solutions for 0° (North), 45°, 90°, 120°, 330°, 360° for instance, would be evaluated. After combination of the data, the periodic signature of the pipe would be searched for in all trial solutions. The solution that yields the best pipe signature correlation would indicate not only the pipe presence but also the pipe orientation.

In order to try some simple pipe signature enhancement methods, the combined data may be processed to eliminate isolated spikes. Spikes that are too large to possibly come from a real pipe are eliminated. After elimination of the spikes, the combined noise may be reduced. The combined pipe data plus processed environmental data may then be superimposed resulting in a clear pipe signature.

As the pipe is buried further, its signal diminished and it becomes more difficult to locate. For instance, at a depth of five feet, the signal is about five times smaller than it is at a two foot depth.

Locator 20 according to a preferred embodiment of this invention is capable of detecting buried 7% strontium ferrite plastic pipe at least approximately 60% of the time for a burial depth of three feet. For a two foot burial depth, the same pipe can be located at least approximately 80% of the time, whereas at a four foot burial depth the same pipe can be located at least approximately 40% of the time.

Several improvements to locator 20 may result in better and more easily collected data. Locator 20 may be reduced in weight to ease fatigue on the operator. An adjustable length feature may be incorporated into locator 20 to ensure that locator 20 is positioned near ground level when used by operators of varying heights. The software may be improved by including additional flying spot modes. The maintenance and storage capability may be improved by enabling the disconnection of gradiometer tube 35 and signal output device from wand 25. The electronic circuit design may be improved by moving the speaker drive circuitry to a small new PC board located in the main body of locator 20. This will allow speaker volume and on/off controls to be also moved to the main body and be equally accessible to left and right handed users. The complexity and current consumption of the electronic circuits may be reduced by using TTL communication levels between the LCD module and gradiometer module. Pipe depth measuring capability may be incorporated into locator software. Finally locator 20 may be designed as a more "universal" tool by incorporating the capability to locate not only magnetic pipe but also tracer wire, metallic pipe and directional drilling heads (detection of magnetic head, not sonde transmissions).

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. An apparatus for measuring and detecting a magnetic signature of a magnetically detectable object from a distance comprising:
    one portable sensor group for detecting the magnetic signature, the portable sensor group consisting of three gradient sensors, each of the three gradient sensors adapted to independently measure both a magnitude and a direction of the magnetic signature, a first of said gradient sensors measuring an axial gradient in the vertical direction, a second of said gradient sensors measuring a first horizontal gradient in the vertical direction, and a third of said gradient sensors measuring a second horizontal gradient in the vertical direction; and
    a signal output device connected to each of the three gradient sensors.

2. The apparatus of claim 1 wherein each of the three gradient sensors comprise a pair of fluxgate sensors.

3. The apparatus of claim 1 wherein the portable sensor group is positioned within a sensor wand.

4. The apparatus of claim 3 wherein each of the three gradient sensors comprise a first fluxgate sensor located at one end portion of the sensor wand and a second fluxgate sensor located at an opposing end portion of the sensor wand.

5. The apparatus of claim 1 wherein the signal output device includes a liquid crystal bargraph display.

6. The apparatus of claim 5 wherein the signal output device displays the magnitude of the magnetic signature detected by each of the three gradient sensors.

7. The apparatus of claim 5 wherein the signal output device displays the direction of the magnetic signature detected by each of the three gradient sensors.

8. The apparatus of claim 1 further comprising a mapping means connected to the signal output device for identifying a location of the apparatus during measurement and detection.

9. The apparatus of claim 8 wherein said mapping means comprises infrared triangulation signals for providing automatic position information.

10. The apparatus of claim 8 wherein said mapping means comprises a global positioning system connected to the signal output device.

11. The apparatus of claim 1 further comprising a port connected to the signal output device for porting the data to a data processor.

12. The apparatus of claim 11 wherein the port comprises a serial data port integrally connected with the signal output device.

13. The apparatus of claim 1 wherein the signal output device is attached to a neckstrap.

14. An apparatus for measuring and detecting a magnetic signature of a magnetically detectable object from a distance comprising:
    a portable sensor wand for detecting the magnetic signature, said sensor wand comprising one sensor group consisting of three gradient sensors, each of the three gradient sensors adapted to independently measure both a magnitude and a direction of the magnetic signature;
    each of the three gradient sensors comprising a first fluxgate sensor located at a first position along the sensor wand and a second fluxgate sensor located at a second position along the sensor wand;
    a first of said gradient sensors measuring an axial gradient in the vertical direction, a second of said gradient sensors measuring a horizontal gradient in the vertical direction, and a third of said gradient sensors measuring a second horizontal gradient in the vertical direction; and
    a signal output device electronically connected to each of the three gradient sensors.

15. A method for locating buried magnetized plastic pipe within a search area comprising the step of measuring a magnitude and direction of a magnetic signature in an axial gradient in the vertical direction, in a first horizontal gradient in the vertical direction, and in a second horizontal gradient in the vertical direction using an apparatus having one sensor group consisting of three gradient sensors.

16. The method of claim 15 further comprising collecting the measurements in a search area comprising a grid.

17. The method of claim 16 further comprising collecting the measurements at a plurality of points within the grid.

18. The method of claim 17 further comprising analyzing measurements from the individual grid coordinates to determine a location of the plastic pipe.

19. An apparatus for measuring and detecting a magnetic signature of a magnetically detectable object from a distance comprising:
    a portable sensor wand for detecting the magnetic signature, said portable sensor wand comprising three gradient sensors, each of the three gradient sensors adapted to independently measure both a magnitude and a direction of the magnetic signature, an X axis sensor of said gradient sensors positioned along an axis of the portable sensor wand, a Y axis sensor of said gradient sensors positioned sideways relative to the axis of the portable sensor wand, and a Z axis sensor of said gradient sensors positioned forward relative to the axis of the portable sensor wand; and a signal output device connected to each of the three gradient sensors.

20. The apparatus of claim 19 wherein each of the three gradient sensors comprises two fluxgate sensors positioned at either end of the portable sensor wand.

21. The apparatus of claim 19 wherein the signal output device further comprises:

a bar graph mode wherein the signal output device displays a bar graph representing each signal generated by the three gradient sensors.

22. The apparatus of claim 19 wherein the signal output device further comprises:

a flying spot mode wherein the signal output device displays a spot representing a direction of a measured field vector based upon signals generated by two of three gradient sensors.

23. The apparatus of claim 22 further comprising:

a mode selection switch positioned with respect to the signal output device, the mode selection switch for switching between at least two flying spot modes.

24. The apparatus of claim 23 wherein the at least two flying spot modes include a first flying spot mode wherein the spot is positioned based upon signals generated by the X axis sensor and the Y axis sensor and a second flying spot mode wherein the spot is positioned based upon signals generated by the Y axis sensor and the Z axis sensor.

25. The apparatus of claim 24 wherein a size of the spot in the first flying spot mode is determined by a magnitude of a total magnetic field generated by the three gradient sensors.

26. The apparatus of claim 24 wherein a size of the spot in the second flying spot mode is determined by a magnitude of a magnetic field generated by the X axis sensor.

27. The apparatus of claim 19 further comprising:

a mode selection switch positioned with respect to the signal output device, the mode selection switch for switching between a flying spot mode and a bar graph mode.

* * * * *